United States Patent
Parazak et al.

(10) Patent No.: US 7,846,245 B2
(45) Date of Patent: Dec. 7, 2010

(54) INK-JET INKS FOR NEUTRAL GRAY AND BLACK PRINTING

(75) Inventors: Dennis P Parazak, Oceanside, CA (US); Eduardo Amela, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 572 days.

(21) Appl. No.: 11/592,439

(22) Filed: Nov. 2, 2006

(65) Prior Publication Data

US 2008/0107819 A1    May 8, 2008

(51) Int. Cl.
*C09D 11/02*    (2006.01)

(52) U.S. Cl. .................. 106/31.27; 106/31.5; 106/31.48

(58) Field of Classification Search .............. 106/31.27, 106/31.48, 31.5; 427/466; 347/100
See application file for complete search history.

(56) References Cited

U.S. PATENT DOCUMENTS

| | | | |
|---|---|---|---|
| 4,694,302 A | 9/1987 | Hackleman et al. | |
| 5,062,892 A | 11/1991 | Halko | |
| 5,421,871 A | 6/1995 | Onishi et al. | |
| 5,439,517 A * | 8/1995 | Yoshida et al. | 106/31.48 |
| 5,580,372 A | 12/1996 | Gino et al. | |
| 5,725,641 A | 3/1998 | MacLeod | |
| 5,851,273 A | 12/1998 | Morris et al. | |
| 6,251,174 B1 * | 6/2001 | Lavery et al. | 106/31.48 |
| 6,503,308 B2 | 1/2003 | Stramel et al. | |
| 7,005,003 B2 * | 2/2006 | Mott et al. | 106/31.6 |
| 7,033,423 B2 * | 4/2006 | Rolly | 106/31.27 |
| 7,033,425 B2 * | 4/2006 | Blease et al. | 106/31.5 |
| 7,056,373 B2 * | 6/2006 | Blease et al. | 106/31.48 |
| 7,533,980 B2 * | 5/2009 | Bauer et al. | 347/100 |
| 2002/0121219 A1 | 9/2002 | Stramel et al. | |
| 2004/0216638 A1 | 11/2004 | Rolly | |
| 2005/0087099 A1 | 4/2005 | Blease et al. | |
| 2006/0181587 A1 * | 8/2006 | Bauer et al. | 347/100 |
| 2008/0257206 A1 * | 10/2008 | Rengaswamy et al. | 106/31.43 |
| 2008/0266334 A1 * | 10/2008 | Rehman et al. | 347/1 |

* cited by examiner

*Primary Examiner*—Helene Klemanski

(57) ABSTRACT

Ink, ink sets, and methods of printing are provided. The inks can include a plurality of dyes such that upon printing on a print medium, the printed ink or inks can maintain a neutral color, defined by an a* value from about −1 to about 3 and having a b* value from about 3 to about −15. This neutral color can be maintained such that the printed ink or image has these a*b* values for substantially all L* values ranging from about 25 to about 75, or even from 0 to 95.

57 Claims, No Drawings

INK-JET INKS FOR NEUTRAL GRAY AND BLACK PRINTING

BACKGROUND OF THE INVENTION

Color characteristics of dye-containing inks play an important role in the quality of the printed ink-jet image. Perceived color quality can be characterized using any one of several color space systems, such as CIELAB or Munsell, as is well known in the art. With respect to Munsell color space, a given color is defined using three terms, namely Hue, Value, and Chroma. With respect to CIELAB color space, a color is defined using three terms $L^*$, $a^*$, and $b^*$. With this system, $L^*$ defines the lightness of a color, and it ranges from 0 to 100 (with 100 being white). Additionally, the terms $a^*$ and $b^*$, together, define the hue, where $a^*$ ranges from a negative number (green) to a positive number (red), and $b^*$ ranges from a negative number (blue) to a positive number (yellow). Additional terms such as $h°$ (hue angle) and $C^*$ (chroma) are used to further describe a given color. A single ink-jet ink of a first color that has good chroma, gamut, hue angle, and lightfastness is not always optimal for use with other colors. In other words, not only does an individual color, i.e., cyan, magenta, or yellow, have to have acceptable color qualities, but the ink-set in which it is used also plays a role in whether the ink-jet ink performs in an acceptable manner. Further, it is very difficult to formulate an ink or ink set that can be used to generate neutral grey along the entire $L^*$ range, e.g., where the $a^*$ and $b^*$ color values of the ink(s) are each very close to 0.

Accordingly, investigations continue into developing ink and ink set formulations that have acceptable color values.

DETAILED DESCRIPTION OF THE PREFERRED EMBODIMENT(S)

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used in this specification and the appended claims, the singular forms "a," "an," and "the" include plural referents unless the context clearly dictates otherwise. Thus, for example, reference to "an ink" includes one or more of such inks, reference to "an amount of dyes" includes reference to one or more amounts of dyes, and reference to "the ink set" includes reference to one or more ink sets.

As used herein, "liquid vehicle" or "ink vehicle" refers to the liquid fluid in which colorant is placed to form an ink. Ink vehicles are well known in the art, and a wide variety of ink vehicles may be used with the systems and methods of the present invention. Such vehicles may include a mixture of a variety of different agents, including solvents, co-solvents, buffers, biocides, sequestering agents, viscosity modifiers, surface-active agents (surfactants), water, etc.

As used herein, the term "neutral" when referring to white paper, an ink, or an ink set, or terms such as "neutral ink" or "neutral ink set" refers to inks or ink sets where $a^*$ and $b^*$ values for given black or gray ink(s) are each close to 0 (zero) at a given $L^*$ value. Ideally, inks or ink sets will allow for the printing of neutral images on neutral white paper along the entire white to black ($L^*$) ramp. "Neutral paper" refers to a paper having $a^*$ and $b^*$ values that are also each relatively close to 0. It is notable that people of different cultures and backgrounds view the color space differently, and thus, neutral coloring is somewhat subjective. This being stated, in accordance with embodiments of the present invention where grays and blacks are printed, acceptable $a^*$ values can range from about −1 to about 3, and acceptable $b^*$ values can range from about 3 to about −15. Thus, a media sheet ($L^*$ is about 100) that starts within these value ranges, and where the $a^*b^*$ ranges can be maintained within these ranges when ramping up the printed ink from a very light gray image to a perceptibly black image ($L^*$ is about 0), is considered to be a neutral gray ramp along the entire $L^*$ axis.

As used herein, "ink" refers to a single liquid vehicle that contains at least one dye, and in accordance with embodiments of the present invention, certain key inks will include at least two dyes that can be used to print neutral grays and black.

As used herein, "dye" refers to the individual compound, complex, or molecule primarily responsible for the color of an ink, including dyes that affect the overall color of an ink, but which are not themselves the predominant color. For example, a black ink may contain several black dyes but may also contain a yellow dye and/or a magenta dye which provides a more neutral black color.

As used herein, "black ink" includes inks having a plurality of dyes that can be printed to generate perceptibly gray or black image, depending on the density at which the black ink is printed. This term includes inks containing black and non-black dyes, although the overall printed color generated using such inks would be referred to as gray or black by an ordinary viewer.

As used herein, "gray ink" refers to an ink having a plurality of dyes that can achieve lighter shades of gray, even with heavier density printing compared to the black ink. This term also includes inks having black and non-black dyes.

As used herein, "black dye" refers to any of a number of black dyes, such as Pacified Reactive Black 31, Direct Black 168, Ilford K1334, Acid Black 52, Direct Black 170, Direct Black 22, Direct Black 19, Direct Black IJ Dye, Reactive Black 8, Solvent Black 13, copper complexed azo black, and the like.

As used herein, "non-black dye" refers to all other dyes that are not defined as black including, but not limited to, magenta dyes, yellow dyes, cyan dyes, blue dyes, red dyes, pink dyes, and the like.

As used herein, the term "ramp" or "color ramp" refers to printing of inks or ink sets at various densities so that an $L^*$ value of a given color ranges from about 0 (black or near black) to about 95 (very light color). Ramps are typically printed as a diagnostic to determine the properties of several representative "color" points between two end points ($L^*$ ranging from about 0 to about 95). For example, a color ramp might include 5 to 20 printed squares (or other shapes) which are relatively evenly spaced in color density between 0 and 95, e.g., a gray-black color ramp might include printed squares at $L^*$ values of 0, 20, 35, 50, 70, 85, and 95. This being stated, it is recognized that black and gray are not typically referred to as "colors," as they ideally are not suppose to exhibit significant $a^*$ and $b^*$ values (though this is very difficult to achieve along an entire color ramp). However, for convenience of terms, the term "color ramp" will be used herein to describe light gray to near black ramps.

As used herein, it is noted that discussion of "second" dyes, "third" dyes, "fourth" dyes, "fifth" dyes, etc., does not infer necessarily that that number of dyes is present in a single ink-jet ink. For example, an ink may include a first dye, a second dye, and a fifth dye (totaling three dyes). In an ink set discussion, a second ink-jet ink may include a third dye and a fourth dye (totaling two dyes). Further, a first black dye and a third black dye that are present in two different ink sets may, in fact, be the same dye or different dyes. However, if a first black dye and a third black dye are described as being in a single ink, these dyes are necessarily different dyes. Still further, a dye described as a "first dye" in one embodiments should not necessarily necessitate an interpretation that a "first dye" in a second embodiment are the same.

As used herein, "plurality" refers to more than one. For example, a plurality of dyes refers to at least two dyes.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop inks, ink sets, and methods of printing that result in acceptable levels of neutrality when printing a color ramp from very light gray to perceptibly black. In accordance with this, the present invention is drawn to neutral gray and black inks and neutral gray and black ink sets, as well as related methods. It is noted that when discussing a single ink, an ink set, or a method of printing herein, each of these discussions can be considered applicable to each of these embodiments, whether or not they are explicitly discussed in the context of that embodiment. Thus, for example, in discussing the dyes present in an ink-jet ink, those dyes can also be used in the ink set embodiments or the method of printing embodiments, and vice versa.

In a first embodiment, a neutral ink can comprise at least a black dye and a yellow dye. Other embodiments can include additional dyes, such as a magenta dye or a second black dye. While the inks and ink sets are generally directed towards ink-jet printing applications, the inks can be used from a number of printing techniques. The neutrality of the gray and/or black inks can be defined by the CIELAB color space, using the terms $L^*$, $a^*$, and $b^*$ as previously discussed, and as is generally recognized in the art as an effective method of characterizing color space. In accordance with this, the inks of the present invention can contain a combination of dyes in a specific ratio such that after printing on a neutral print medium, the printed ink maintains a neutral color, preferably across the entire $L^*$ range (from light to dark). In one embodiment, the neutral gray scale can be defined by the printed ink or image having an $a^*$ value from about $-1$ to about 3 and a $b^*$ value from about 3 to about $-15$ for $L^*$ values ranging from about 25 to about 75. In a more detailed aspect of this embodiment, the $L^*$ values can range from about 0 to about 95. In another embodiment, the $a^*$ value can be from about $-0.5$ to about 3 and the $b^*$ value can be from about 0 to about $-10$ for $L^*$ values ranging from about 25 to about 75. In yet another embodiment, the $a^*$ value can be from about 0 to about 2.5 and the $b^*$ value can be from about 0 to about $-8$ for $L^*$ values ranging from about 25 to about 75.

Each of the inks described herein can also include a third dye, a fourth dye, etc. The third can be selected from any number of dyes including, but not limited to, a magenta dye, a yellow dye, a cyan dye, a second black dye, and the like. In one embodiment, the third dye can be a magenta dye, for example, in embodiments where the ink already includes two black dyes, or a black and a yellow dye. In another embodiment, the third dye can be a second black dye, for example, in embodiments where the ink jet ink includes a first black dye and a yellow dye.

In one embodiment, the ink can further contain a fourth dye. The fourth dye can be selected from any number of dyes including, but not limited to, a magenta dye, a yellow dye, a cyan dye, another black dye, and the like. In a preferred embodiment, the fourth dye is a magenta dye. For example, the dyes in an ink can be one or two black dyes, a yellow dye, and a magenta dye.

The black dyes in any of the embodiments described herein can include, but are not limited to, Pacified Reactive Black 31, Direct Black 168, Ilford K1334, Acid Black 52, Direct Black 170, Direct Black 22, Direct Black 19, Direct Black IJ Dye, Reactive Black 8, Solvent Black 13, copper complexed azo black, and the like. In one embodiment, one black dye can be Pacified Reactive Black 31 or Direct Black 168, or alternatively, both of these black dyes can be used. Regarding the yellow dye, any acceptable yellow dye can be used that promotes neutrality in the ink, including Yellow 104, Yellow 1189, Acid Yellow 17, Acid Yellow 23, Direct Yellow 132, and Direct Yellow 86. In one embodiment, Y1189 and/or Y104 can be used. Regarding the magenta dye, if present, any of a number of magenta dyes can be used that promotes neutrality, including Acid Red 52, Ilford M377, Reactive Red 23, Acid Red 289, Hydrolyzed Reactive Red 180, as well as the dyes hereinafter defined as "Magenta Dye A," "Magenta Dye B," and "Magenta Dye C."

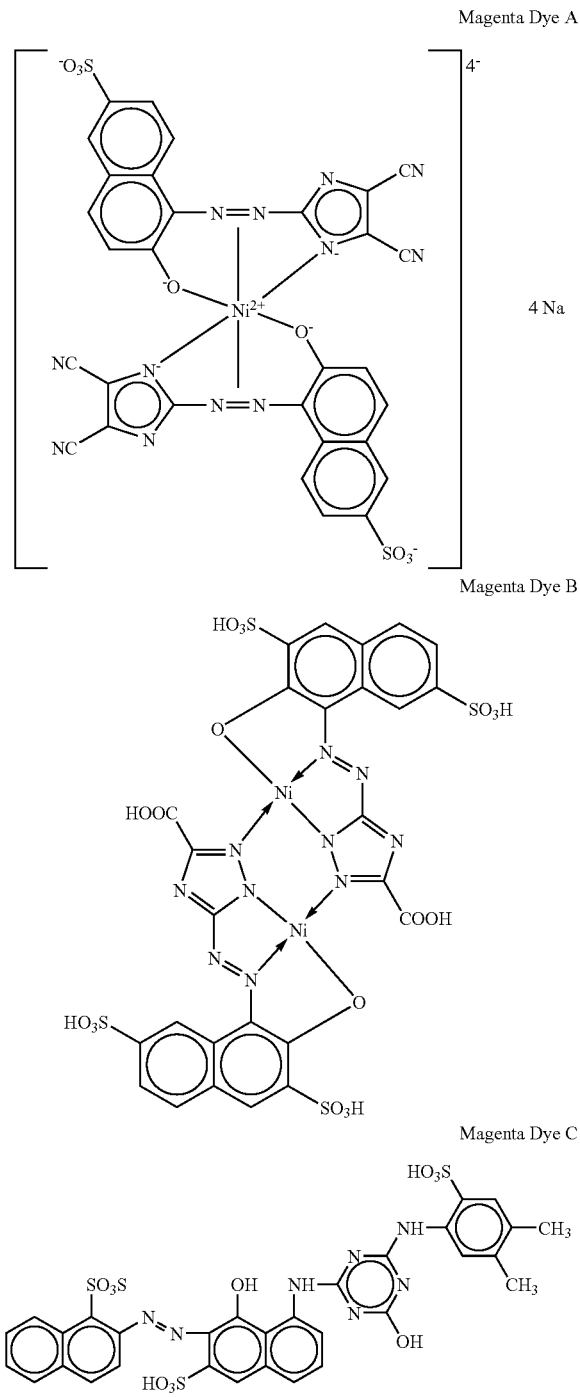

Magenta Dye A

Magenta Dye B

Magenta Dye C

It is noted that though Magenta Dye A is shown as a sodium salt, and Magenta Dyes B and C are not shown as salts, any of these dyes can be in salt form or in non-salt form. Acceptable salt counterions include sodium, lithium, ammonium, etc.

The ink(s) can contain black dye(s) in various ratios and weight percentages to achieve the neutrality in accordance with embodiments of the present invention. For example, the black dye can be present in the ink from about 0.1 wt % to about 10 wt %. When the ink contains multiple black dyes, multiple black dyes can be present collectively at from about 0.1 wt % to about 10 wt %. For example, in one embodiment, an ink composition can contain a first black dye from about 1.5 wt % to about 5 wt % and a second black dye from about 0.5 wt % to about 3 wt %. Alternatively, the black dyes can be present in equal amounts or one black dye may be present in a considerably higher concentration. For example, the weight ratio of a first black dye to a second black dye can range from about 10:1 to about 1:2. In one embodiment, the weight ratio can be about 2:1.

Whether one or more black dyes are present, other dyes can also be present at various weight ratios and weight percentages. For example, a yellow dye and/or a magenta dye can be present in black or gray ink at from about 0.1 wt % to about 3 wt %. In one embodiment, a yellow dye can be present at from about 0.001 wt % to about 1.0 wt %. In another embodiment, a yellow dye can be present at from about 0.2 wt % to about 0.3 wt %. Likewise, a magenta dye can be present at from about 0.001 wt % to about 1.0 wt %. In one embodiment, a magenta dye can be present at from about 0.01 wt % to about 0.1 wt %.

Generally, the black dyes can be present at a considerably higher concentration compared to the other non-black dyes. For example, the weight ratio of a black dye(s) to non-black dye(s) can range from about 50:1 to about 1:1. In one embodiment, the weight ratio of yellow dye(s) to a black dye(s) can range from about 10:1 to about 1:1. In another embodiment, the weight ratio of a magenta dye(s) to a black dye(s) can range from about 50:1 to about 20:1. Additionally, the ratio of a yellow dye(s) to a magenta dye(s) can range from about 10:1 to about 1:10. In one embodiment, the ratio of a yellow dye(s) to a magenta dye(s) can be from about 6:1 to about 4:1. It is noted that these ratios are based on total black dye or dyes to total yellow dye or dyes, total black dye or dyes to total magenta dye or dyes, or total yellow dye or dyes to total magenta dye or dyes.

It is noted that the present invention is not only drawn to methods of printing and specific inks, but to ink sets. A neutral ink set can include a black ink containing a first black dye and a second black dye, and a gray ink containing a third black dye and a fourth dye. Upon printing the black ink, the gray ink, or a blend of the black and gray ink on a neutral print medium to form a printed image, the printed image can be neutral gray or neutral black. The neutral gray or neutral black can be defined by the printed image having an a* value from about −1 to about 3 and having a b* value from about 3 to about −15. This printed image remains within these a*b* value ranges for L* values ranging from about 25 to about 75. Specifically, the ink set can contain a combination of inks that include dyes at specific ratios such that after printing on a print medium, the printed ink maintains a neutral color. In one embodiment, the a* value can be from about −1 to about 3 and the b* value can be from about 3 to about −15 for L* values ranging from about 0 to about 95. In another embodiment, the a* value can be from about −0.5 to about 3 and the b* value can be from about 0 to about −10 for L* values ranging from about 25 to about 75. In yet another embodiment, the a* value can be from about 0 to about 2.5 and the b* value can be from about 0 to about −8 for L* values ranging from about 25 to about 75.

The black dyes of an ink set can include any of those previously described. For an individual ink, describing the ink as containing a plurality of black dyes must by necessity mean that the black dyes are different for that particular ink. However, when describing an ink set as containing a plurality of black dyes, the ink set does not require by necessity that the black dyes are different, as the same black dye may be present in each individual ink. As such, the ink sets of the present invention may contain black dyes that are the same, different, or containing a common black dye(s) with a different black dye(s).

The gray and black inks of the present invention can contain non-black dyes. The non-black dyes of the ink set may include magenta dye, a yellow dye, a cyan dye, blue dye, pink dye, red dye, or the like. With respect to the yellow dye or the magenta dye, those described above are suitable for use, as well as other similar dyes. With respect to the dyes of other colors, any dye suitable for obtaining neutral blacks and/or grays can also be used. In one embodiment, the black ink contains a yellow dye. In another embodiment, the gray ink includes a yellow dye. In another embodiment, the black ink and/or the gray ink contain a magenta dye and/or another black dye. Third, fourth, fifth, sixth, etc., dyes of any color can also be present in the ink set, as may be desirable to obtain neutral grays along substantially all of the L* value range. As mentioned, the ink set can further contain secondary or tertiary black dyes in either the black or the gray ink. In one specific embodiment, the black ink can contain two different black dyes, a yellow dye, and a magenta dye. In a more detailed aspect of this embodiment, one black dye can be pacified Reactive Black 31, the other black dye can be Direct Black 168, the yellow dye can be Y104, and the magenta dye can be Magenta Dye A, as shown above. In another embodiment, the gray ink can contain two different black dyes and a yellow dye. In a more detailed aspect of this embodiment, one black dye can be pacified Reactive Black 31, the other black dye can be Direct Black 168, and the yellow dye can be Y104.

Like the inks, the ink sets of the present invention can contain black dyes and other dyes at various ratios and weight percentages to achieve neutral printed ink in accordance with the embodiments of the present invention. For example, black and gray inks can have black dyes in the amount from about 0.1 wt % to about 10 wt %. In one embodiment, the black ink can contain a first black dye from about 1.5 wt % to about 5 wt % and a second black dye from about 0.5 wt % to about 3 wt %. However, a gray ink generally contains less black dye(s) when compared to the companion black ink, so the gray ink can provide better coverage of lighter grays at higher resolution. In one embodiment, the gray ink can contain black dye(s) from about 0.01 wt % to about 3 wt %. For example, in one embodiment, the gray ink can include two black dyes with a first black dye ranging from about 0.01 wt % to about 2 wt % and a second black dye from about 0.001 wt % to about 1 wt %. Of course, the black and gray inks are not required to have the same black dye(s), though often, they may have the same of one or more of the black dye(s). The amount of black dyes in the gray and black inks varies with the types of black dyes contained in each ink set. The weight percents of the non-black dyes have been previously discussed and may be applied to the black and gray inks of the present ink set. The ratios of individual black and non-black dyes in an ink have also been previously discussed and can be applied to the black ink of the present ink set.

It is also noteworthy to state that the black ink and the gray ink can have dye ratios with respect to one another as follows. For example, the black ink black dye ($BL_b$) to gray ink black dye ($G_b$) weight ratio can be from about 10:1 to about 1:1. In another embodiment, the $BL_b$ to $G_b$ ratio can be from about 4:1 to about 3:1. Similarly, the black ink non-black dye ($BL_{nb}$) to gray ink non-black dye ($G_{nb}$) ratio can be from about 5:1 to about 1:5. In another embodiment, the $BL_{nb}$ to $G_{nb}$ ratio can be from about 2:1 to about 1:2. Of course, the black and non-black dyes for the inks and ink sets disclosed in the present invention can be present outside these ranges and ratios as well, depending on the ink set.

In addition to the inks and ink sets described above, a method of printing a neutral gray image on a print medium can comprise ink-jetting an ink set on a neutral print medium to form a printed image. The ink set can comprise a black ink and a gray ink, wherein the black ink includes a first black dye and the gray ink includes a second black dye, and wherein at least one of the black ink or the gray ink includes a yellow dye. In this embodiment, after printing on the neutral print medium, the printed image is neutral gray or neutral black, as defined by the printed ink having an a* value from about −1 to about 3 and having a b* value from about 3 to about −15. This printing step can be capable of generating the printed image having these a*b* values for L* values ranging from about 0 to about 95.

In each of the above embodiments, typical ink vehicle formulations that can be used with the inks, ink sets, and methods of the present invention can include water and one or more co-solvent, present in total at from 5.0 wt % to 50.0 wt % by weight. One or more non-ionic, cationic, and/or anionic surfactant can also be present, and if present, can be included at from 0.01 wt % to 10.0 wt %. Other vehicle components known in the art such as biocides, viscosity modifiers, materials for pH adjustment, sequestering agents, preservatives, latexes, polymers, and the like, can also be present.

Classes of solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, 1-6-alcohols, ethylene glycol alkyl ethers, propylene glycol alkyl ethers, higher homologs of polyethylene glycol alkyl ethers, substituted and unsubstituted lactams, N-alkyl caprolactams, unsubstituted caprolactams, both substituted and unsubstituted formamides, both substituted and unsubstituted acetamides, and the like. Specific examples of solvents that can be used include 1-(2-Hydroxyethyl)-2-pyrrolidinone, 2-pyrrolidinone, and 1,6-Hexanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents such as EDTA (ethylene diamine tetra acetic acid) may be included to eliminate the deleterious effects of heavy metal impurities, and buffer solutions may be used to control the pH of the ink. From 0.001% to 2.0% by weight, for example, of either of these components can be used. Viscosity modifiers and buffers may also be present, as well as other additives known to those skilled in the art to modify properties of the ink as desired. Such additives can be present at from 0.01% to 20% by weight.

EXAMPLES

The following examples illustrate various aspects of the inks and ink sets in accordance with embodiments of the present invention. The following examples should not be considered as limitations of the invention, but should merely teach how to make the best coatings, reflecting the present invention.

Example 1

Neutral Ink 1

An ink-jet ink composition is prepared in accordance with Table 1, as follows:

TABLE 1

| Component | Amount |
|---|---|
| 2-Pyrrolidone | 5.00 wt % |
| 1,6-Hexanediol | 9.00 wt % |
| Hydroxyalkylated 2-Pyrrolidone | 9.00 wt % |
| Tetramethyldecyne-diol | 0.16 wt % |
| Fluorinated Nonionic Surfactant | 0.50 wt % |
| Alkyldiphenyloxide Disulfonate | 0.32 wt % |
| MOPS Buffer | 0.10 wt % |
| EDTA-Na salt | 0.0075 wt % |
| Phosphate Ester of Oxyalkylated $C_{18}$ Alcohol | 0.40 wt % |
| Proxel GXL | 0.10 wt % |
| Y104-Na | 0.284 wt % |
| PRB 31-Na | 2.63 wt % |
| DB168-Na | 1.35 wt % |
| Deionized water | balance |

Adjust pH to 8.0 with NaOH or HNO$_3$

Tables 2-5 provide L*, a*, b* values along 11 point color ramps for four different types of print media samples in accordance with embodiments of the present invention.

TABLE 2

| Gradient Squares | L* | a* | b* |
|---|---|---|---|
| [1]MEDIA | 93.32 | 1.87 | −7.45 |
| 1 | 93.31 | 1.85 | −7.36 |
| 2 | 88.57 | 1.87 | −7.19 |
| 3 | 82.97 | 1.86 | −6.87 |
| 4 | 77.39 | 1.88 | −6.61 |
| 5 | 71.23 | 1.83 | −6.19 |
| 6 | 64.77 | 1.86 | −5.85 |
| 7 | 59.38 | 1.77 | −5.59 |
| 8 | 51.81 | 1.63 | −5.15 |
| 9 | 42.12 | 1.5 | −4.71 |
| 10 | 31.54 | 1.29 | −3.97 |
| 11 | 17.47 | −0.14 | −2.26 |

[1]Coated Paper

TABLE 3

| Gradient Squares | L* | a* | b* |
|---|---|---|---|
| [2]MEDIA | 94.47 | 1.99 | −9.03 |
| 1 | 94.44 | 1.99 | −9.23 |
| 2 | 87.9 | 2.07 | −8.5 |
| 3 | 81.39 | 2.17 | −7.7 |

TABLE 3-continued

| Gradient Squares | L* | a* | b* |
|---|---|---|---|
| 4 | 75.23 | 2.19 | −7.25 |
| 5 | 68.93 | 2.28 | −6.61 |
| 6 | 61.71 | 2.37 | −6.13 |
| 7 | 55.98 | 2.43 | −5.79 |
| 8 | 47.5 | 2.57 | −5.36 |
| 9 | 38.22 | 2.78 | −4.87 |
| 10 | 27.97 | 2.92 | −4.32 |
| 11 | 5.06 | 1.91 | −1.38 |

[2]Universal Semi-Gloss Paper

TABLE 4

| Gradient Squares | L* | a* | b* |
|---|---|---|---|
| [3]MEDIA | 94.61 | 2.86 | −9.69 |
| 1 | 94.62 | 2.93 | −9.79 |
| 2 | 88.43 | 2.54 | −9.16 |
| 3 | 81.45 | 2.18 | −8.58 |
| 4 | 74.87 | 1.8 | −7.96 |
| 5 | 68.33 | 1.48 | −7.31 |
| 6 | 61.65 | 1.24 | −6.64 |
| 7 | 56.55 | 1.17 | −6.25 |
| 8 | 49.69 | 0.99 | −5.51 |
| 9 | 41.52 | 0.72 | −4.59 |
| 10 | 34.26 | 0.54 | −3.81 |
| 11 | 25.48 | −0.02 | −2.63 |

[3]Bright White Paper

TABLE 5

| Gradient Squares | L* | a* | b* |
|---|---|---|---|
| [4]MEDIA | 93.8 | 1.83 | −9.02 |
| 1 | 93.83 | 1.82 | −8.96 |
| 2 | 87.28 | 1.92 | −8.27 |
| 3 | 80.74 | 2.05 | −7.62 |
| 4 | 74.44 | 2.13 | −6.98 |
| 5 | 68.03 | 2.21 | −6.37 |
| 6 | 61.18 | 2.32 | −5.95 |
| 7 | 55.42 | 2.41 | −5.63 |
| 8 | 47.04 | 2.54 | −5.12 |
| 9 | 37.71 | 2.78 | −4.67 |
| 10 | 26.88 | 2.95 | −4.13 |
| 11 | 4.11 | 1.89 | −1.01 |

[4]Universal High Gloss

Example 2

Neutral Ink 2

An ink-jet ink composition is prepared in accordance with Table 6, as follows:

TABLE 6

| Component | Amount |
|---|---|
| 2-Pyrrolidone | 5.00 wt % |
| 1,6-Hexanediol | 9.00 wt % |
| Hydroxyalkylated 2-Pyrrolidone | 9.00 wt % |
| tetramethyldecyne-diol | 0.16 wt % |
| Fluorinated Nonionic Surfactant | 0.50 wt % |
| Alkyldiphenyloxide Disulfonate | 0.32 wt % |
| MOPS Buffer | 0.10 wt % |
| EDTA-Na salt | 0.0075 wt % |

TABLE 6-continued

| Component | Amount |
|---|---|
| Phosphate Ester of Oxyalkylated C$_{18}$ Alcohol | 0.40 wt % |
| Proxel GXL | 0.10 wt % |
| Y104-Na | 0.284 wt % |
| PRB 31-Na | 2.10 wt % |
| DB168-Na | 1.24 wt % |
| MAGENTA DYE A | 0.050 wt % |
| Deionized water | Balance |

Adjust pH to 8.0 with NaOH or HNO$_3$

Tables 7-10 provide L*, a*, b* values along 11 point color ramps for four different types of print media samples in accordance with embodiments of the present invention.

TABLE 7

| Gradient Squares | L* | a* | b* |
|---|---|---|---|
| [1]MEDIA | 94.39 | 1.36 | −6.66 |
| 1 | 94.25 | 1.31 | −6.67 |
| 2 | 89.49 | 1.22 | −6.63 |
| 3 | 84.16 | 1.15 | −6.5 |
| 4 | 78.62 | 1 | −6.33 |
| 5 | 72.92 | 0.92 | −6.13 |
| 6 | 65.03 | 0.95 | −5.83 |
| 7 | 59.28 | 0.77 | −5.56 |
| 8 | 51.23 | 0.59 | −5.25 |
| 9 | 41.69 | 0.53 | −4.95 |
| 10 | 30.76 | 0.32 | −4.32 |
| 11 | 19.23 | −0.65 | −2.95 |

[1]Coated Paper

TABLE 8

| Gradient Squares | L* | a* | b* |
|---|---|---|---|
| [2]MEDIA | 94.54 | 2.04 | −8.88 |
| 1 | 94.5 | 2.02 | −8.86 |
| 2 | 87.83 | 1.93 | −8.27 |
| 3 | 80.93 | 1.85 | −7.76 |
| 4 | 74.67 | 1.8 | −7.22 |
| 5 | 68.36 | 1.91 | −6.76 |
| 6 | 61 | 1.76 | −6.2 |
| 7 | 55.24 | 1.65 | −5.84 |
| 8 | 46.82 | 1.55 | −5.43 |
| 9 | 36.84 | 1.68 | −4.98 |
| 10 | 25.26 | 1.6 | −4.37 |
| 11 | 4.32 | 0.53 | −0.31 |

[2]Universal Semi-Gloss Paper

TABLE 9

| Gradient Squares | L* | a* | b* |
|---|---|---|---|
| [3]MEDIA | 93.43 | 3.05 | −9.86 |
| 1 | 93.31 | 3.05 | −9.87 |
| 2 | 87.71 | 2.73 | −9.54 |
| 3 | 81.55 | 2.15 | −8.8 |
| 4 | 75.65 | 1.74 | −8.18 |
| 5 | 69.26 | 1.49 | −7.62 |
| 6 | 62.09 | 1.07 | −7.05 |
| 7 | 57.09 | 0.67 | −6.47 |
| 8 | 49.91 | 0.33 | −5.63 |
| 9 | 42.8 | 0.21 | −4.85 |
| 10 | 35.55 | 0.15 | −4.05 |
| 11 | 27.31 | −0.32 | −2.61 |

[3]Bright White Paper

TABLE 10

| Gradient Squares | L* | a* | b* |
|---|---|---|---|
| [4]MEDIA | 93.49 | 1.78 | −8.69 |
| 1 | 93.51 | 1.71 | −8.59 |
| 2 | 86.91 | 1.7 | −8.1 |
| 3 | 80.07 | 1.65 | −7.46 |
| 4 | 73.92 | 1.65 | −6.96 |
| 5 | 67.52 | 1.75 | −6.54 |
| 6 | 59.72 | 1.69 | −5.94 |
| 7 | 54.19 | 1.56 | −5.6 |
| 8 | 44.85 | 1.52 | −5.33 |
| 9 | 35.71 | 1.62 | −4.86 |
| 10 | 23.61 | 1.64 | −4.26 |
| 11 | 5.4 | 0.51 | −1.01 |

[4]Universal High Gloss

Example 3

Neutral Ink Set

Two ink-jet ink inks were formulated in accordance with embodiments of the present invention, as provided in Tables 11 and 12:

TABLE 11

Black Ink-jet Ink

| Component | Amounts |
|---|---|
| 2-Pyrrolidone | 5.00 wt % |
| 1,6-Hexanediol | 9.00 wt % |
| Hydroxyalkylated 2-Pyrrolidone | 9.00 wt % |
| Tetramethyldecyne-diol | 0.16 wt % |
| Fluorinated Nonionic Surfactant | 0.80 wt % |
| Alkyldiphenyloxide Disulfonate | 0.32 wt % |
| MOPS Buffer | 0.10 wt % |
| EDTA-Na salt | 0.0075 wt % |
| Phosphate Ester of Oxyalkylated C$_{18}$ Alcohol | 0.40 wt % |
| Proxel GXL | 0.10 wt % |
| Y104-Na | 0.284 wt % |
| PRB 31-Na | 2.10 wt % |
| DB168-Na | 1.24 wt % |
| MAGENTA DYE A | 0.050 wt % |
| Deionized water | Balance |

Adjust pH to 8.0 with NaOH or HNO$_3$

TABLE 12

Gray Ink-jet Ink

| Component | Amounts |
|---|---|
| 2-Pyrrolidone | 5.00 wt % |
| 1,6-Hexanediol | 9.00 wt % |
| Hydroxyalkylated 2-Pyrrolidone | 9.00 wt % |
| Tetramethyldecyne-diol | 0.16 wt % |
| Fluorinated Nonionic Surfactant | 0.80 wt % |
| Alkyldiphenyloxide Disulfonate | 0.32 wt % |
| MOPS Buffer | 0.10 wt % |
| EDTA-Na salt | 0.0075 wt % |

TABLE 12-continued

Gray Ink-jet Ink

| Component | Amounts |
|---|---|
| Phosphate Ester of Oxyalkylated $C_{18}$ Alcohol | 0.40 wt % |
| Proxel GXL | 0.10 wt % |
| Y104-Na | 0.30 wt % |
| PRB 31-Na | 0.85 wt % |
| DB168-Na | 0.106 wt % |
| Deionized water | Balance |

Adjust pH to 8.0 with NaOH or $HNO_3$

Tables 13-16 provide L*, a*, b* values along 11 point color ramps for four different types of print media samples in accordance with embodiments of the present invention. It is noted that in this example, the lighter grays are printed with the ink-jet ink of Table 12, the darker grays and blacks are printed with the ink-jet ink of Table 11, and the medium grays are printed with a blend of the ink-jet inks of Tables 11 and 12.

TABLE 13

| Gradient Squares | L* | a* | b* |
|---|---|---|---|
| [1]MEDIA | 93.69 | 2.59 | −11.88 |
| 1 | 93.27 | 2.34 | −12.23 |
| 2 | 84.88 | 2.29 | −9.58 |
| 3 | 76.65 | 2.28 | −7.46 |
| 4 | 69.1 | 2.19 | −5.6 |
| 5 | 61.66 | 2.14 | −4.12 |
| 6 | 55.03 | 2.06 | −3.01 |
| 7 | 48.14 | 1.94 | −1.94 |
| 8 | 40.35 | 1.63 | −1.86 |
| 9 | 31.38 | 1.22 | −2.75 |
| 10 | 21.06 | 0.92 | −3.57 |
| 11 | 10.92 | 0.89 | −3.28 |

[1]Universal High Gloss

TABLE 14

| Gradient Squares | L* | a* | b* |
|---|---|---|---|
| [2]MEDIA | 94.48 | 2.78 | −10.29 |
| 1 | 93.98 | 2.75 | −11.01 |
| 2 | 85.57 | 2.74 | −8.8 |
| 3 | 77.21 | 2.74 | −6.75 |
| 4 | 69.61 | 2.62 | −5.21 |
| 5 | 62.16 | 2.55 | −3.81 |
| 6 | 55.34 | 2.43 | −2.78 |
| 7 | 48.23 | 2.23 | −1.73 |
| 8 | 40.4 | 1.74 | −1.76 |
| 9 | 31.63 | 1.31 | −2.47 |
| 10 | 21.49 | 0.97 | −3.39 |
| 11 | 11.39 | 0.96 | −3.43 |

[2]Universal Semi-Gloss

TABLE 15

| Gradient Squares | L* | a* | b* |
|---|---|---|---|
| [3]MEDIA | 94.91 | 0.03 | −3.54 |
| 1 | 94.82 | −0.01 | −3.42 |
| 2 | 85.01 | 0.7 | −1.84 |
| 3 | 75.54 | 1.32 | −0.68 |
| 4 | 68.35 | 1.74 | 0.48 |
| 5 | 61.39 | 2.12 | 1.32 |
| 6 | 55.01 | 2.34 | 2.01 |
| 7 | 48.32 | 2.51 | 2.56 |
| 8 | 40.73 | 1.9 | 1.95 |
| 9 | 31.42 | 0.83 | 0.29 |
| 10 | 20.41 | −0.29 | −1.6 |
| 11 | 9.38 | −0.58 | −2.52 |

[3]Professional Photo Gloss

TABLE 16

| Gradient Squares | L | A | B |
|---|---|---|---|
| [4]MEDIA | 94.33 | 2.44 | −11.09 |
| 1 | 94.35 | 2.41 | −11.01 |
| 2 | 86.32 | 2.3 | −8.67 |
| 3 | 79.1 | 2.2 | −6.78 |
| 4 | 73.13 | 2.12 | −5.35 |
| 5 | 65.05 | 1.82 | −4.18 |
| 6 | 58.09 | 1.43 | −4.07 |
| 7 | 50.52 | 1.06 | −4.43 |
| 8 | 45.17 | 1.06 | −4.85 |
| 9 | 37.61 | 0.88 | −3.92 |
| 10 | 31.16 | 0.49 | −2.43 |
| 11 | 24.53 | 0.39 | 0.36 |

[4]Universal Ink-Jet Bond

Of course, it is to be understood that the above-described formulations and arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An ink-jet ink, comprising:
   a) a black dye; and
   b) a yellow dye
wherein the black dye and the yellow dye are combined in the ink at a ratio such that after printing on a neutral print medium, the printed ink is neutral gray, said neutral gray defined by the printed ink having an a* value from about −1 to about 3 and having a b* value from about 3 to about −15, said printed ink having these a*b* values for substantially all L* values ranging from about 25 to about 75.

2. The ink-jet ink of claim 1, wherein the ink further comprises a third dye.

3. The ink-jet ink of claim 2, wherein the third dye is selected from the group consisting of a cyan dye, a magenta dye, a second yellow dye, and a second black dye.

4. The ink-jet ink of claim 3, wherein the third dye is a magenta dye.

5. The ink-jet ink of claim 4, wherein the magenta dye is selected from the group consisting of Acid Red 52, Ilford M377, Reactive Red 23, Acid Red 289, Hydrolyzed Reactive Red 180,

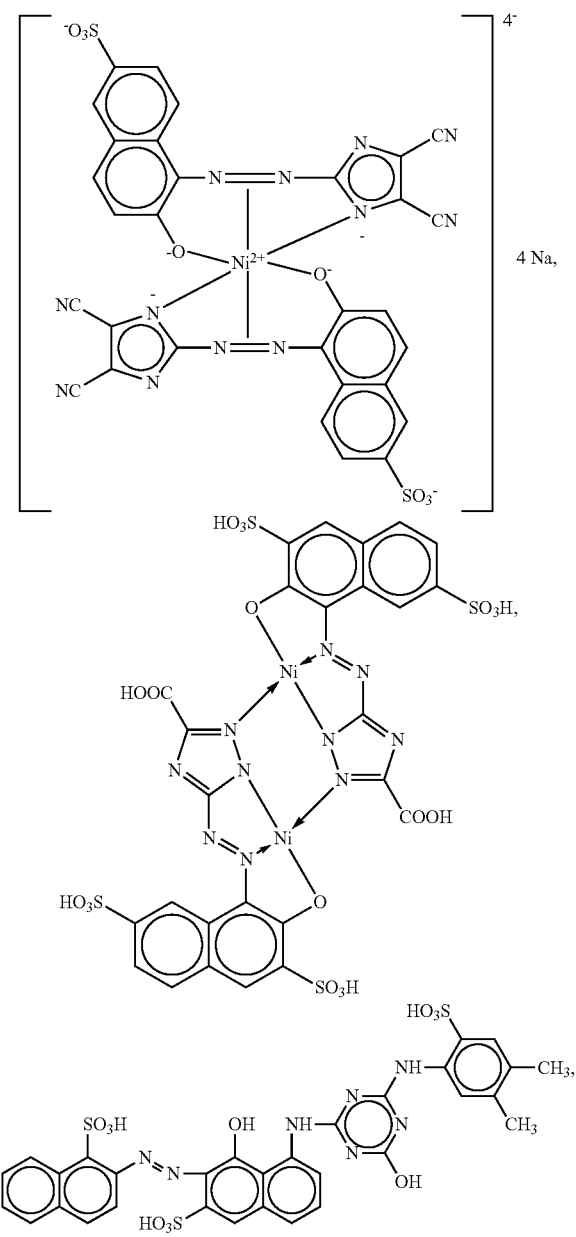

and combinations thereof.

6. The ink-jet ink of claim 3, wherein the third dye is a second black dye.

7. The ink-jet ink of claim 6, wherein at least one of the black dye and the second black dye is Pacified Reactive Black 31 or Direct Black 168.

8. The ink-jet ink of claim 2, wherein the ink further comprises a fourth dye.

9. The ink-jet ink of claim 8, wherein the fourth dye is a magenta dye.

10. The ink-jet ink of claim 8, wherein the fourth dye is a third black dye.

11. The ink jet ink of claim 1, wherein the black dye is selected from the group consisting of pacified Reactive Black 31, Direct Black 168, Ilford K1334, Acid Black 52, Direct Black 170, Direct Black 22, Direct Black 19, Direct Black IJ Dye, Reactive Black 8, Solvent Black 13, copper complexed azo black, and combinations thereof.

12. The ink-jet ink of claim 11, wherein the black dye is pacified Reactive Black 31.

13. The ink-jet ink of claim 1, wherein the yellow dye is Yellow 104.

14. The ink jet ink of claim 1, wherein the neutral print medium has an a* value from about −1 to about 3, a b* value from about 3 to about −15, and an L* value from about 90 to about 100.

15. The ink-jet ink of claim 1, wherein the print medium is selected from the group consisting of plain paper and coated paper.

16. The ink jet ink of claim 1, wherein the black dye is present in the ink from about 0.1 wt % to about 10 wt %.

17. The ink-jet ink of claim 1, wherein the yellow dye is present in the ink from about 0.1 wt % to about 3.0 wt %.

18. The ink-jet ink of claim 1, wherein the a* value is from about −1 to about 3 and the b* value is from about 3 to about −15, said printed ink having these a*b* values for substantially all L* values ranging from about 0 to about 95.

19. The ink-jet ink of claim 1, wherein the a* value is from about 0 to about 2.5 and the b* value is from about 0 to about −8, said printed ink having these a*b* values for substantially all L* values ranging from about 25 to about 75.

20. An ink set, comprising:
a) a black ink containing a first black dye and a second dye, and
b) a gray ink containing a third black dye and a fourth dye, wherein upon printing the black ink, the gray ink, or a blend of the black and gray ink on a neutral print medium to form a printed image, the printed image is neutral gray or neutral black, said neutral gray or neutral black defined by the printed image having an a* value from about −1 to about 3 and having a b* value from about 3 to about −15, said printed image remaining within these a*b* value ranges for all L* values ranging from about 25 to about 75.

21. The ink set of claim 20, wherein the first black dye and third black dye are independently selected from the group consisting of pacified Reactive Black 31, Direct Black 168, Ilford K1334, Acid Black 52, Direct Black 170, Direct Black 22, Direct Black 19, Direct Black IJ Dye, Reactive Black 8, Solvent Black 13, copper complexed azo black, and combinations thereof.

22. The ink set of claim 20, wherein the first black dye and the third black dye are the same.

23. The ink set of claim 22, wherein the first black dye and the third black dye are pacified Reactive Black 31.

24. The ink set of claim 20, wherein the first black dye and the third black dye are different.

25. The ink set of claim 20, wherein the second dye is a cyan dye, a magenta dye, or a yellow dye.

26. The ink set of claim 20, wherein the second dye is a black dye that is different than the first black dye.

27. The ink set of claim 25, wherein the second dye is a yellow dye.

28. The ink set of claim 20, wherein the ink set further comprises a fifth dye which is present in the black ink.

29. The ink set of claim 28, wherein in the black ink, the second dye is a yellow dye and the fifth dye is a magenta dye.

30. The ink set of claim 20, wherein in the gray ink, the fourth dye is selected from the group consisting of a magenta dye, a yellow dye, a cyan dye, and a black dye.

31. The ink set of claim 30, wherein in the gray ink, the fourth dye is a yellow dye.

32. The ink set of claim 31, wherein the gray ink further comprises a sixth dye which is a magenta dye or a black dye.

33. The ink set of claim 32, wherein the sixth dye is a black dye.

34. The ink set of claim 33, wherein in the gray ink, the third black dye is pacified Reactive Black 31, the yellow dye is Yellow 104, and the black dye is Direct Black 168.

35. The ink set of claim 29, wherein the ink set further comprises a seventh dye which is present in the black ink.

36. The ink set of claim 35, wherein the seventh dye is selected from the group consisting of a magenta dye, a yellow dye, a cyan dye, and a black dye.

37. The ink set of claim 36, wherein the seventh dye is a black dye.

38. The ink set of claim 37, wherein in the black ink includes pacified Reactive Black 31, Direct Black 168, Yellow 104, and

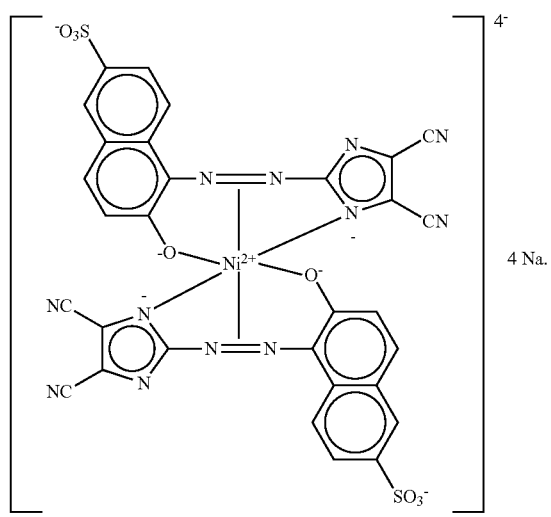

39. The ink set of claim 20, wherein the neutral print medium has an a* value from about −1 to about 3, a b* value from about 3 to about −15, and an L* value from about 90 to about 100.

40. The ink set of claim 20, wherein the print medium is selected from the group consisting of plain paper and coated paper.

41. The ink set of claim 20, wherein the a* value is from about −1 to about 3 and the b* value is from about 3 to about −15, said printed image having these a*b* values for substantially all L* values ranging from about 0 to about 95.

42. The ink set of claim 20, wherein the a* value is from about 0 to about 32.5 and the b* value is from about 0 to about −8, said printed ink having these a*b* values for substantially all L* values ranging from about 25 to about 75.

43. A method of printing a neutral gray image on a print medium, comprising ink-jetting an ink set on a neutral print medium to form a printed image, said ink set comprising a black ink and a gray ink, wherein the black ink includes a first black dye and the gray ink includes a second black dye, and wherein at least one of the black ink or the gray ink includes a yellow dye, such that after printing on the neutral print medium, the printed image is neutral gray or neutral black, said neutral gray or neutral black defined by the printed ink having an a* value from about −1 to about 3 and having a b* value from about 3 to about −15, said printing step being capable of generating the printed image having these a*b* values for substantially all L* values ranging from about 0 to about 95.

44. The method of claim 43, wherein the neutral print medium has an a* value from about −1 to about 3, a b* value from about 3 to about −15, and an L* value from about 90 to about 100.

45. The method of claim 43, wherein the first black dye and second black dye are independently selected from the group consisting of pacified Reactive Black 31, Direct Black 168, Ilford K1334, Acid Black 52, Direct Black 170, Direct Black 22, Direct Black 19, Direct Black IJ Dye, Reactive Black 8, Solvent Black 13, copper complexed azo black, and combinations thereof.

46. The method of claim 43, wherein the first black dye and the second black dye are the same.

47. The method of claim 43, wherein the first black dye and the second black dye are different.

48. The method of claim 43, wherein the yellow dye is in the black ink.

49. The method of claim 43, wherein the yellow dye is in the gray ink.

50. The method of claim 43, wherein the black ink and the gray ink both include a yellow dye.

51. The method of claim 50, wherein the yellow dye in the black ink and the yellow dye in the gray ink are the same.

52. The method of claim 50, wherein the yellow dye in the black ink and the yellow dye in the gray ink are different.

53. The method of claim 50, wherein at least one of the black ink or the gray ink include a magenta dye.

54. The method of claim 53, wherein the at least one of the black ink or the gray ink that includes the magenta dye also includes a yellow dye.

55. The method of claim 54, wherein the black ink includes the magenta and yellow dye.

56. The method of claim 43, wherein the a* value is from about −1 to about 3 and the b* value is from about 3 to about −15, said printed image having these a*b* values for substantially all L* values ranging from about 0 to about 95.

57. The method of claim 43, wherein the a* value is from about 0 to about 2.5 and the b* value is from about 0 to about −8, said printed ink having these a*b* values for substantially all L* values ranging from about 25 to about 75.

* * * * *

UNITED STATES PATENT AND TRADEMARK OFFICE
CERTIFICATE OF CORRECTION

| | | |
|---|---|---|
| PATENT NO. | : 7,846,245 B2 | Page 1 of 1 |
| APPLICATION NO. | : 11/592439 | |
| DATED | : December 7, 2010 | |
| INVENTOR(S) | : Dennis P Parazak et al. | |

It is certified that error appears in the above-identified patent and that said Letters Patent is hereby corrected as shown below:

In column 15, line 64, in Claim 11, delete "ink jet" and insert -- ink-jet --, therefor.

In column 16, line 7, in Claim 14, delete "ink jet" and insert -- ink-jet --, therefor.

In column 16, line 14, in Claim 16, delete "ink jet" and insert -- ink-jet --, therefor.

In column 17, line 53 (Approx.), in Claim 42, delete "32.5" and insert -- 2.5 --, therefor.

Signed and Sealed this
Eleventh Day of October, 2011

David J. Kappos
*Director of the United States Patent and Trademark Office*